(12) United States Patent
Wang et al.

(10) Patent No.: US 11,144,711 B2
(45) Date of Patent: Oct. 12, 2021

(54) WEBPAGE RENDERING METHOD, DEVICE, ELECTRONIC APPARATUS AND STORAGE MEDIUM

(71) Applicant: Baidu Online Network Technology (Beijing) Co., Ltd, Beijing (CN)

(72) Inventors: Ning Wang, Beijing (CN); Yanting Zhang, Beijing (CN); Junfang Han, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/875,575

(22) Filed: May 15, 2020

(65) Prior Publication Data

US 2021/0133388 A1    May 6, 2021

(30) Foreign Application Priority Data

Oct. 31, 2019 (CN) .......................... 201911052348.4

(51) Int. Cl.
 *G06F 40/143* (2020.01)
 *H04L 29/08* (2006.01)
 *H04L 29/06* (2006.01)

(52) U.S. Cl.
 CPC ............ *G06F 40/143* (2020.01); *H04L 67/02* (2013.01); *H04L 67/10* (2013.01); *H04L 67/42* (2013.01)

(58) Field of Classification Search
 CPC ....... G06F 40/143; H04L 67/02; H04L 67/10; H04L 67/42

USPC ......................................................... 715/235
See application file for complete search history.

(56) References Cited

U.S. PATENT DOCUMENTS

| 10,291,738 B1* | 5/2019 | Jaiswal ................ G06F 16/9574 |
| 2011/0022500 A1* | 1/2011 | Scheinfeld ............ G06F 3/0481 |
| | | 705/27.2 |
| 2014/0222966 A1* | 8/2014 | Marins ................... H04L 67/02 |
| | | 709/219 |

(Continued)

FOREIGN PATENT DOCUMENTS

GN    106339414 A    1/2017

OTHER PUBLICATIONS

Extended European Search Report dated Nov. 16, 2020 in connection with corresponding European Patent Application No. 20175916.4.

(Continued)

*Primary Examiner* — William D Titcomb
(74) *Attorney, Agent, or Firm* — Akerman LLP

(57) ABSTRACT

A webpage rendering method and device, an electronic apparatus and a storage medium are provided, which are related to a field of web rendering technology. A specific implementation includes: receiving an access request of a target webpage from a terminal; and sending a page configuration file of the target webpage to the terminal, in response to the access request of the target webpage, wherein the page configuration file is configured to form a pre-rendered page of the target webpage, and the pre-rendered page includes a part or all of the target webpage that has been rendered; and the pre-rendered page is configured to enable the terminal to acquire a rendered page of the target webpage.

20 Claims, 15 Drawing Sheets

(56) References Cited

U.S. PATENT DOCUMENTS

| | | | | |
|---|---|---|---|---|
| 2015/0095409 | A1* | 4/2015 | Mak | G06Q 30/0271 |
| | | | | 709/203 |
| 2015/0293890 | A1* | 10/2015 | Zhou | G06F 16/9577 |
| | | | | 715/238 |
| 2016/0306894 | A1* | 10/2016 | Liang | G06F 16/9574 |
| 2017/0024098 | A1* | 1/2017 | Doherty | G11B 27/11 |
| 2017/0068997 | A1* | 3/2017 | Kawakita | G06Q 30/0277 |
| 2017/0371974 | A1* | 12/2017 | Liu | G06F 16/957 |
| 2019/0253503 | A1* | 8/2019 | Austin | G06F 16/9558 |
| 2019/0373043 | A1* | 12/2019 | Jaiswal | G06F 40/14 |
| 2020/0154155 | A1* | 5/2020 | Sanghavi | H04N 21/26258 |

OTHER PUBLICATIONS

Kasireddy, Preethi, "How the Web Works Part II: Client-Server Model & the Structure of a Web Application," Tech & Coding, Dec. 17, 2015 (Dec. 17, 2015), pp. 1-11.

* cited by examiner

Cash for Video

Small Classroom for Everyone

PLAY ▶

Billions of Bonuses, the highest in the whole network — Go to shoot

Ten times the income through V certification — To certify

To get commission by inviting friends to shoot — Go to invite

| Daily leaderboard | | Leaderboard | |
|---|---|---|---|
| Ranking | Creator | Number of Videos | Income (RMB) |
| 1 | *** | 2182 | 39,000 |
| 2 | *** | 268 | 31,000 |
| 3 | *** | 937 | 31,000 |
| 4 | *** | 2130 | 30,000 |
| 5 | *** | 1710 | 30,000 |

FIG. 5

WEBPAGE RENDERING METHOD, DEVICE, ELECTRONIC APPARATUS AND STORAGE MEDIUM

CROSS-REFERENCE TO RELATED APPLICATIONS

This application claims priority to Chinese Patent Application No. 201911052348.4, entitled "Webpage Rendering Method, Device, Electronic Apparatus and Storage Medium", filed with the Chinese Patent Office on Oct. 31, 2019, which is hereby incorporated by reference in its entirety.

TECHNICAL FIELD

The present application relates to a field of mobile communication technology, and in particular, to a field of webpage rendering technology.

BACKGROUND

A webpage application (Web App) is an application in Internet space that is deeply integrated with various mobile clients, desktop clients, and servers. The Web App is a continuously open platform which integrates and distributes large-scale content, and natively involves in the spirit of Internet which is to link everything. With upgradation and iteration of a mobile communication technology and an expansion of a traffic pool in rich media content, such as audios and videos, a user is particularly sensitive to a webpage loading speed at a terminal.

Implementations in the existing technology mostly adopts the following scheme: after receiving an access request from a terminal, a server uses a template engine to generate a page of a Web App, and then sends the generated page to the terminal in response to the access request. According to the scheme, the workload of a server will be increased, which in turn causes a speed of acquiring pages of a Web App to become slower, therefore, expectations and demands of a user for a page display speed may not be met.

SUMMARY

A web rendering method, a device, an electronic apparatus, and a storage medium are provided according to embodiments of the present application, to at least solve above technical problems in the existing technology.

In a first aspect, a web rendering method, applied to a server, is provided according to an embodiment of the present application. The method includes:

receiving an access request of a target webpage from a terminal; and sending a page configuration file of the target webpage to the terminal, in response to the access request of the target webpage, wherein the page configuration file is configured to form a pre-rendered page of the target webpage, and the pre-rendered page includes a part or all of the target webpage that has been rendered; and the pre-rendered page is configured to enable the terminal to acquire a rendered page of the target webpage.

By applying the above scheme, the workload of a server is greatly reduced. After receiving an access request, a server does not perform any rendering operation, which is performed by a terminal instead. Since a page configuration file may be used to form a pre-rendered page of a target webpage, a terminal may directly generate a pre-rendered page and a rendered page after acquiring the configuration file, thereby improving efficiency in overall.

In an implementation, the page configuration file is stored in a content distribution network; and the sending the page configuration file of the target webpage to the terminal includes:

sending the page configuration file of the target webpage from the content distribution network to the terminal.

By applying the above scheme, a speed of acquiring a page configuration file by a terminal may be improved, through a content distribution network.

In an implementation, the page configuration file includes a Hypertext markup language file, a cascading style sheet file, and a script language file; wherein the Hypertext markup language file is stored in a first content distribution network; and the cascading style sheet file and the script language file are stored in a second content distribution network, wherein an address of the first content distribution network is the same as an address of the target webpage, and an address of the second content distribution network is included in the Hypertext markup language file.

By applying the above scheme, it is avoided that all files are stored in a first content distribution network, causing storage and access issue of a content distribution network. Different content distribution networks are used to achieve a file balance, thereby improving efficiency in overall.

In an implementation, the sending the page configuration file of the target webpage from the content distribution network to the terminal includes:

sending the Hypertext markup language file from the first content distribution network to the terminal according to a geographic location of the terminal;

receiving a file acquisition request from the terminal; and sending the cascading style sheet file and the script language file from the second content distribution network to the terminal, in response to the file acquisition request.

By applying the above scheme, a terminal may acquire a Hypertext markup language file from a node closer to the location of the terminal, by using characteristics of a content distribution network. A terminal may acquire a cascading style sheet file and a script language file according to an address in a Hypertext markup language file. A speed of acquiring a page configuration file of a target webpage by a terminal is improved in overall.

In an implementation, in a case that the pre-rendered page is a part of the target webpage, the webpage rendering method further includes:

filling a skeleton page in a remaining part of the target webpage.

By applying the above scheme, a remaining position of a target webpage may be occupied by a skeleton page in advance. A pre-rendered page and a skeleton page are firstly displayed, so that a blank screen or a long rendering process is avoided, thereby improving user experience.

In an implementation, the script language file includes a storage address of user personalized data, and the webpage rendering method further includes:

acquiring user identification information of the terminal; and sending user personalized data matching the user identification information from the storage address of the user personalized data to the terminal, wherein the user personalized data is used to fill the skeleton page in a process of forming a rendered page of the target webpage at the terminal.

By applying the above scheme, in a case that user personalized data is acquired, a skeleton page may be filled with the user personalized data, to form a final page of a target webpage. A terminal may obtain a target webpage as quickly as possible, thereby reducing white screen time and waiting time for rendering.

In a second aspect, a webpage rendering method is provided according to an embodiment of the present application, which is applied to a terminal. The method includes:
 sending an access request of a target webpage to a server;
 receiving a page configuration file of the target webpage sent by the server;
 forming a pre-rendered page of the target webpage according to the page configuration file, wherein the pre-rendered page includes a part or all of the target webpage that has been rendered; and
 acquiring a rendered page of the target webpage according to the pre-rendered page.

In an implementation, the page configuration file is stored in a content distribution network; and
 the receiving the page configuration file of the target webpage sent by the server includes:
 receiving the page configuration file of the target webpage sent by the server from the content distribution network.

In an implementation, the page configuration file includes a Hypertext markup language file, a cascading style sheet file, and a script language file,
 the Hypertext markup language file is stored in a first content distribution network; and
 the cascading style sheet file and the script language file are stored in a second content distribution network, wherein
 an address of the first content distribution network is the same as an address of the target webpage, and an address of the second content distribution network is included in the Hypertext markup language file.

In an implementation, the receiving the page configuration file of the target webpage sent by the server from the content distribution network includes:
 receiving the Hypertext markup language file from the first content distribution network;
 sending a file acquisition request to the address of the second content distribution network; and
 receiving the cascading style sheet file from the second content distribution network.

In an implementation, the forming the pre-rendered page of the target webpage according to the page configuration file includes:
 forming the pre-rendered page of the target webpage according to the Hypertext markup language file and the cascading style sheet file.

In an implementation, in a case that the pre-rendered page includes a part of the target webpage that has been rendered, a remaining part of the target webpage is filled with a skeleton page; and
 the acquiring the rendered page of the target webpage according to the pre-rendered page includes:
 receiving the script language file from the second content distribution network, wherein the script language file includes a storage address of user personalized data;
 sending user identification information to the storage address of the user personalized data;
 receiving the user personalized data sent by the server; and
 filling the skeleton page with the user personalized data.

In a third aspect, a web rendering device is provided according to an embodiment of the present application, which is applied to a server. The device includes:

an access request receiving module, configured to receive an access request of a target webpage from a terminal; and
 a page configuration file sending module, configured to send a page configuration file of the target webpage to the terminal, in response to the access request of the target webpage, wherein
 the page configuration file is configured to form a pre-rendered page of the target webpage, and the pre-rendered page includes a part or all of the target webpage that has been rendered; and
 the pre-rendered page is configured to enable the terminal to acquire a rendered page of the target webpage.

In an implementation, the page configuration file includes a Hypertext markup language file, a cascading style sheet file, and a script language file, and
 the device further includes:
 a first storage module, configured to store the Hypertext markup language file in a first content distribution network; and
 a second storage module, configured to store the cascading style sheet file and the script language file in a second content distribution network, wherein
 an address of the first content distribution network is the same as an address of the target webpage, and an address of the second content distribution network is included in the Hypertext markup language file.

In an implementation, the page configuration file sending module includes:
 a first sending sub-module, configured to send the Hypertext markup language file from the first content distribution network to the terminal according to a geographic location of the terminal;
 a first receiving sub-module, configured to receive a file acquisition request from the terminal; and
 a second sending sub-module, configured to send the cascading style sheet file and the script language file from the second content distribution network to the terminal, in response to the file acquisition request.

In an implementation, in a case that the pre-rendered page is a part of the target webpage, the device further includes:
 a filling module, configured to fill a skeleton page in a remaining part of the target webpage.

In an implementation, the script language file includes a storage address of user personalized data, and
 the webpage rendering device further includes:
 a user identification information acquiring module, configured to acquire user identification information of the terminal; and
 a personalized data sending module, configured to send user personalized data matching the user identification information from the storage address of the user personalized data to the terminal, wherein
 the user personalized data is used to fill the skeleton page in a process of forming a rendered page of the target webpage at the terminal.

In a fourth aspect, a webpage rendering device is provided according to an embodiment of the present application, which is applied to a terminal. The device includes:
 an access request sending module, configured to send an access request of a target webpage to a server;
 a page configuration file receiving module, configured to receive a page configuration file of the target webpage sent by the server;
 a first rendering module, configured to form a pre-rendered page of the target webpage according to the page configuration file, wherein the pre-rendered page includes a part or all of the target webpage that has been rendered; and a second rendering module, configured to acquire a rendered page of the target webpage according to the pre-rendered page.

In an implementation, the page configuration file includes a Hypertext markup language file, a cascading style sheet file, and a script language file, wherein the Hypertext markup language file is stored in a first content distribution network; and the cascading style sheet file and the script language file are stored in a second content distribution network, wherein an address of the first content distribution network is the same as an address of the target webpage, and an address of the second content distribution network is included in the Hypertext markup language file.

In an implementation, the page configuration file receiving module includes:

a second receiving sub-module, configured to receive the Hypertext markup language file;

a third sending sub-module, configured to send a file acquisition request to the address of the second content distribution network; and a third receiving sub-module, configured to receive the cascading style sheet file from the second content distribution network.

In an implementation, the first rendering module includes:

a rendering execution sub-module, configured to form the pre-rendered page of the target webpage according to the Hypertext markup language file and the cascading style sheet file.

In an implementation, in a case that the pre-rendered page includes a part of the target webpage that has been rendered, a remaining part of the target webpage is filled with a skeleton page; and the second rendering module includes:

a script language file receiving sub-module, configured to receive the script language file from the second content distribution network, wherein the script language file includes a storage address of user personalized data;

a user identification information sending sub-module, configured to send user identification information to the storage address of the user personalized data;

a user personalized data receiving sub-module, configured to receive the user personalized data sent by the server; and a skeleton page filling sub-module, configured to fill the skeleton page with the user personalized data.

In a fifth aspect, an electronic apparatus is provided according to an embodiment of the present application. The electronic apparatus includes:

at least one processor; and a memory communicated with the at least one processor, wherein instructions executable by the at least one processor are stored in the memory, and the instructions are executed by the at least one processor, to enable the at least one processor to implement any one of the webpage rendering method.

In a sixth aspect, a non-transitory computer-readable storage medium, in which computer instructions are stored, is provided according to an embodiment of the present application, wherein the computer instructions are configured to enable a computer to implement any one of the webpage rendering method.

Other effects of the foregoing alternative implementations will be described below with reference to specific embodiments.

BRIEF DESCRIPTION OF THE DRAWINGS

The drawings are illustrated only for better understanding the present application, rather than being restrictive to the present application, in which:

FIG. 5 is a schematic diagram showing a final rendered page of a target web;

DETAILED DESCRIPTION OF EMBODIMENTS

With reference to the accompanying drawings, exemplary embodiments of the present application are described below, which include various details of the embodiments of the present application to facilitate understanding and should be considered as merely exemplary. Therefore, those of ordinary skilled in the art should recognize that various changes and modifications can be made to the embodiments described herein, without departing from the scope and spirit of the present application. Also, for clarity and conciseness, descriptions for public knowledge of functions and structures are omitted in the following descriptions.

Figure 1:
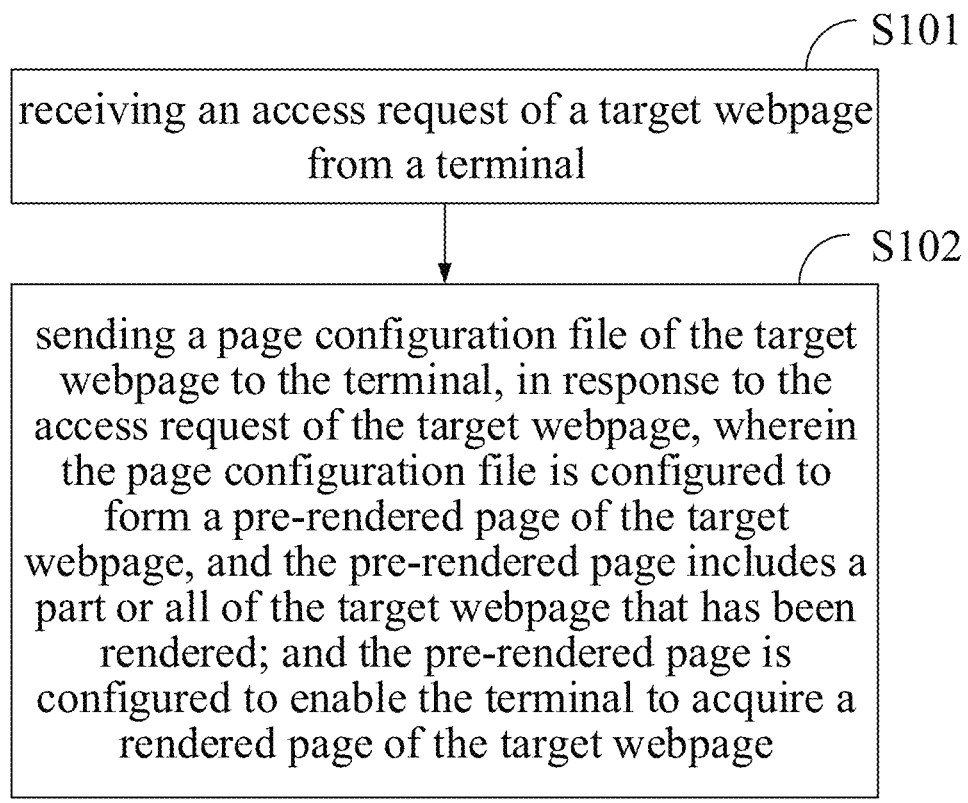
FIG. 1 is a schematic diagram showing a webpage rendering method according to a first embodiment of the present application.

FIG. 1 is a flowchart showing a webpage rendering method of the present application. As shown in FIG. 1, when applied to a server, the method includes following steps:

S101, receiving an access request of a target webpage from a terminal;

S102, sending a page configuration file of the target webpage to the terminal, in response to the access request of the target webpage, wherein the page configuration file is configured to form a pre-rendered page of the target webpage, and the pre-rendered page includes a part or all of the target webpage that has been rendered, and the pre-rendered page is configured to enable the terminal to acquire a rendered page of the target webpage.

After receiving an access request of a target webpage from a terminal, a server may query a page configuration file of the target webpage. The page configuration file of the target webpage may be generated in advance. For example, in a development phase of a target webpage, a developer may employ a continuous integration environment in a local mode to run a pre-written configuration file in a Hypertext Markup Language (Html) format.

A continuous integration environment may be a development environment, in which various processes, such as a code merge process, a build process, a deployment process and a test process are included and continuously repeated and results thereof are fed back. The continuous integration environment in the local mode may be executed through a browser or an application program (APP) of a terminal. A terminal may include an apparatus, such as a personal computer and a smart phone.

A pre-written configuration file in a Hypertext markup language format may be developed by using different frames, such as a REACT frame and a VUE frame. Taking the REACT frame as an example, the core idea of the frame is to encapsulate a component. When a state of the component changes, the component is automatically re-rendered. The component may include a structural component, a layout component, a script component, and the like.

A structural component may define an element of a target webpage, such as a menu, a button, a picture, and a text.

A layout component may define a position and size of an element mentioned above, such as a menu, a button, a picture, and a text.

A script component may define a state change of an element mentioned above, such as a menu, a button, a picture, and a text. For example, when a user clicks, a menu pops up with a drop-down option.

In addition, a network address may also be defined in a script component, so that a terminal sends an access request to a defined network address, after acquiring and executing the script component.

A server recognizes a continuous integration environment in the local mode according to a user agent (UA) of a browser or an application of a terminal. A pre-written configuration file in a Hypertext markup language format is performed by using a pre-rendering program, to acquire a page configuration file of a target webpage. The page configuration file is used to form a pre-rendered page of the target webpage, and the pre-rendered page includes a part or all of the target webpage that has been rendered. The pre-rendered page is used to enable the terminal to acquire a rendered page of the target webpage.

Figure 2:
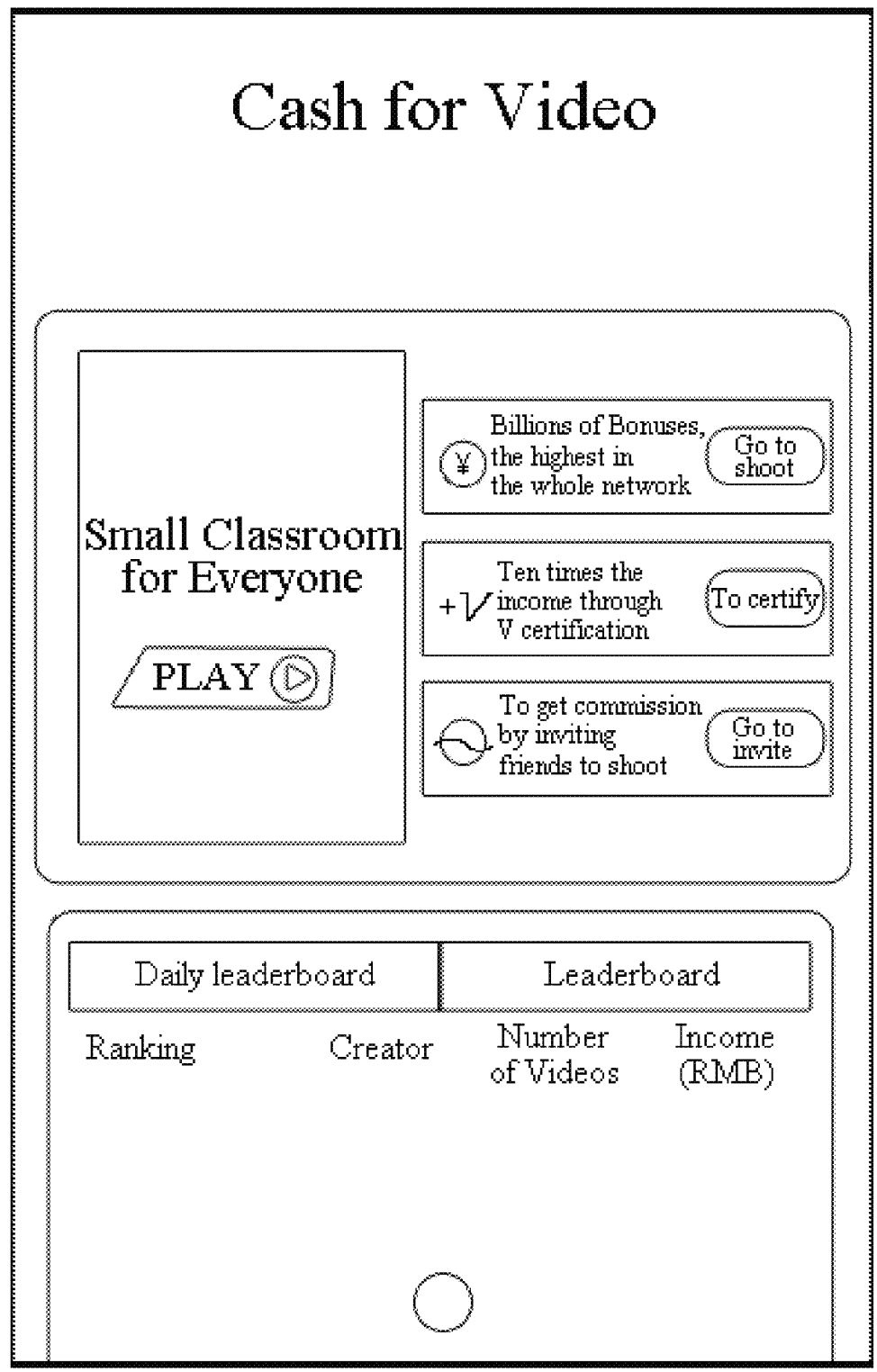
FIG. 2 is a schematic diagram showing a pre-rendered page of a target webpage.

FIG. 2 is a schematic diagram showing a pre-rendered page of a target webpage that may be formed by using a page configuration file. In the pre-rendered page, displaying areas corresponding to text boxes, such as "Cash for Video", "Small Classroom for Everyone", "Billions of Bonuses, the highest in the whole network!", "Ten times the income through V certification!", "To get commission by inviting friends to shoot", and displaying areas corresponding to virtual interactive buttons, such as "PLAY", "Go to shoot", "To certify" and "Go to invite", may correspond to pre-rendered pages.

In a continuous integration environment in a local mode, multiple developers may modify and adjust a pre-written configuration file in a Hypertext markup language format, when running it. Therefore, a module loading packager (Webpack) may be used to package the pre-written configuration file in a Hypertext markup language format, so that other developers may acquire entire content of the configuration file. After a packaging, a package entry may be displayed through a displaying plugin (Library Target) of a module loading packager, so that other developers may acquire the pre-written configuration file in a Hypertext markup language format according to the displayed entry.

Since a page configuration file of a target webpage has been acquired before a terminal access, when receiving an access request of a target webpage from a terminal, a server may recognize the access request according to a user agent of a terminal browser or an application, and send the configuration file to the terminal.

After receiving a configuration file, a terminal may display a pre-rendered page shown in FIG. 2 in the first place. Compared with a server in the existing technology, which performs a rendering operation when receiving an access request from a terminal each time, by applying the above scheme, the workload of a server is greatly reduced. Meanwhile, a speed of displaying a page of a target webpage by a terminal may be accelerated.

In addition, since a page configuration file of a target webpage is generated in advance, a server does not need to perform a pre-rendering operation when receiving an access request each time. Instead, the server only needs to send the page configuration file of a target webpage to a terminal. In this way, a reuse of a page configuration file of a target webpage is realized.

In an implementation, the page configuration file is stored in a content distribution network; and the sending the page configuration file of the target webpage to the terminal includes:

sending the page configuration file of the target webpage from the content distribution network to the terminal.

By applying the above scheme, a speed of acquiring a page configuration file by a terminal may be improved, through a content distribution network.

In an implementation, the page configuration file includes a Hypertext markup language file, a cascading style sheet file, and a script language file; where the Hypertext markup language file is stored in a first content distribution network; and the cascading style sheet file and the script language file are stored in a second content distribution network, where an address of the first content distribution network is the same as an address of the target webpage, and an address of the second content distribution network is included in the Hypertext markup language file.

A module loading packager may be used to run a pre-written configuration file in a Hypertext markup language format, where the module loading packager includes a pre-rendering plugin, which may be used to acquire a page configuration file of a target webpage. Further, the configuration file may be split into a Hypertext Markup Language (Html) file, a Cascading Style Sheet (CSS) file, and a Scripting Language (JS) file. Exemplarily, the pre-rendering plugin may be a prerender-spa-plugin.

A server stores the Hypertext markup language file acquired by a split in a first Content Distribution Network (CDN). An address of the first content distribution network may be the same as an address of the target webpage.

In addition, a server stores a cascading style sheet file and a script language file in a second content distribution network. An address of the second content distribution network may be the same as or different from an address of the target webpage.

A Hypertext markup language file acquired by a split includes a pre-declared address of a second content distribution network. Therefore, after acquiring a Hypertext markup language file, according to the declared address of the second content distribution network, a terminal may send a file acquisition request to the address, to acquire the cascading style sheet file and the script language file. The specific acquiring process will be described hereafter.

By applying the above steps, a terminal may acquire a relevant page configuration file from a node closer to the location of the terminal, by using characteristics of a content distribution network, thereby increasing a speed of acquiring a page configuration file.

In addition, page configuration files are stored separately, which facilitates a reduction of storage pressure of a first content distribution network. Since the addresses of a first content distribution network and the address of a target webpage are the same, in a case that all subsets of page configuration files are stored in the first content distribution network, the storage pressure of the first content distribution network will be increased.

On the other hand, since a terminal acquires a Hypertext markup language file, a cascading style sheet file, and a script language file in a certain order, the communication pressure of a first content distribution network may be reduced by storing the above files separately.

Figure 3:
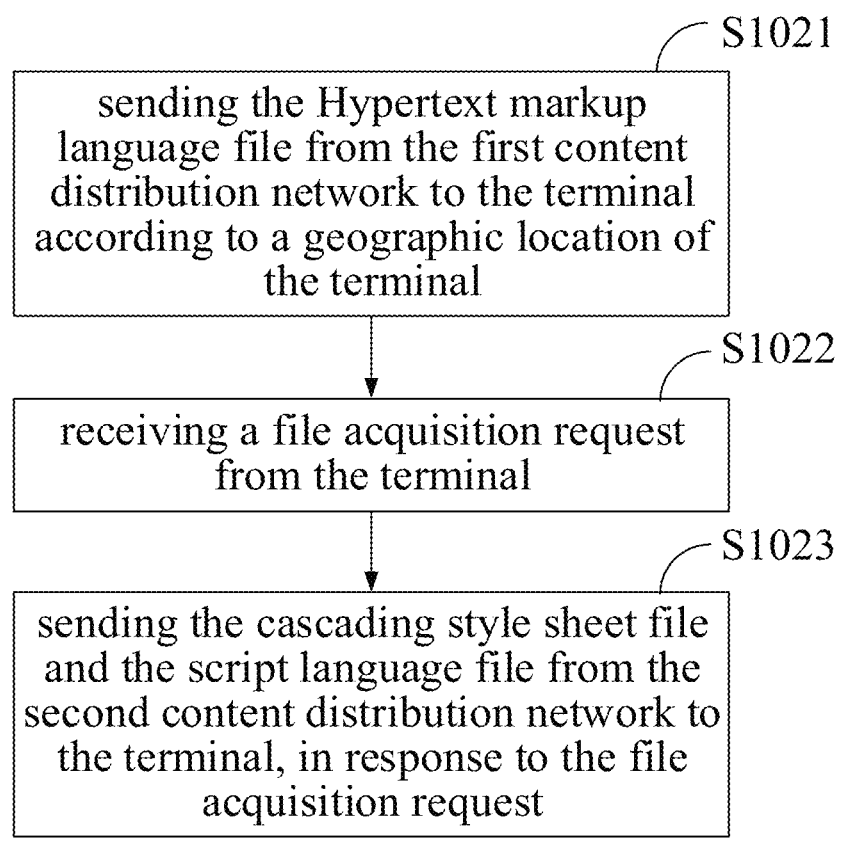
FIG. 3 is a schematic diagram showing a webpage rendering method according to a first embodiment of the present application.

As shown in FIG. 3, in an implementation, the sending the page configuration file of the target webpage from the content distribution network to the terminal includes:

S1021: sending the Hypertext markup language file from the first content distribution network to the terminal according to a geographic location of the terminal;

S1022: receiving a file acquisition request from the terminal; and

S1023: sending the cascading style sheet file and the script language file from the second content distribution network to the terminal, in response to the file acquisition request.

According to a geographic location of a terminal, a server determines a node closer to the geographic location, among multiple nodes of a first content distribution network. A Hypertext markup language file is delivered to the terminal from this node. Through a first content distribution network, a terminal may acquire a Hypertext markup language file of a target webpage in a page configuration file in the shortest time for display. A geographic location of a terminal may be acquired by querying a communication operator of the terminal.

Alternatively, a server may further determine a node based on a geographic location of a terminal and the load of each node. For example, in a case that the distance between a terminal and a second node is greater than the distance between the terminal and a first node, and the load of the first node is much greater than that of the second node, the server may deliver a Hypertext markup language file to the terminal through the second node when the terminal accesses the first node.

A first content distribution network may be provided on the server side or may be provided at different terminals. For example, in the case where two users use different terminals to access a same target webpage at close range (such as in a same room or face-to-face), and a terminal used by the first user firstly acquires a Hypertext markup language file of the target webpage, the terminal may be used as a first content distribution network. In the case where the second user accesses the target webpage, the second user may acquire the Hypertext markup language file of the target webpage from the terminal used by the first user. Therefore, a speed of accessing a target webpage may be further improved.

After receiving a Hypertext markup language file of a target webpage, a terminal sends a file acquisition request to an address of a second content distribution network in the Hypertext markup language file of the target webpage.

In the case where a server receives a file acquisition request, a cascading style sheet file and a script language file may be sent to a terminal.

A terminal may acquire a pre-rendered page of a target webpage according to a Hypertext markup language file and a cascading style sheet file of the target webpage. The pre-rendered page corresponds, for example, to the page in the schematic diagram shown in FIG. 2.

By applying the above scheme, a terminal may acquire a Hypertext markup language file in the shortest time, thereby acquiring a cascading style sheet file and a script language file according to an address in the Hypertext markup language file. A speed of acquiring a page configuration file of a target webpage by a terminal is improved in overall.

In an implementation, in a case that the pre-rendered page is a part of the target webpage, the method further includes:

filling a skeleton page in a remaining part of the target webpage.

With reference to the schematic diagram shown in FIG. 2, where a first displaying area and a second displaying area are included.

The first displaying area may include a pre-rendered page, which displays same content on all terminals. For example, the first displaying area includes displaying areas corresponding to text boxes, such as "Cash for Video", "Small Classroom for Everyone", "Billions of Bonuses, the highest in the whole network!", "Ten times the income through V certification!", "To get commission by inviting friends to shoot", and displaying areas corresponding to virtual interactive buttons, such as "PLAY", "Go to shoot", "To certify" and "Go to invite".

The second displaying area may be used to display different contents, such as user personalized data of a user who is using the terminal. The user personalized data may be an avatar, an online duration, an experience value, etc. of a user. Before acquiring different contents, the second displaying area may be pre-filled with a skeleton page of a target webpage. A skeleton page may include a dynamic (or static) icon shown in FIG. 2 that indicates a loading (Loading) is in progress, or a gray rectangular block or a round block and the like.

The above filling process has been declared in a pre-written configuration file in a Hypertext markup language format mentioned above.

By applying the above scheme, in the case where user personalized data to be filled exists in a target page, a position may be occupied in advance by using a skeleton page, so that a skeleton page is displayed on a terminal in advance in a position where user personalized data to be filled is to be displayed, thereby improving user experience.

In an implementation, the script language file includes a storage address of user personalized data.

Figure 4:
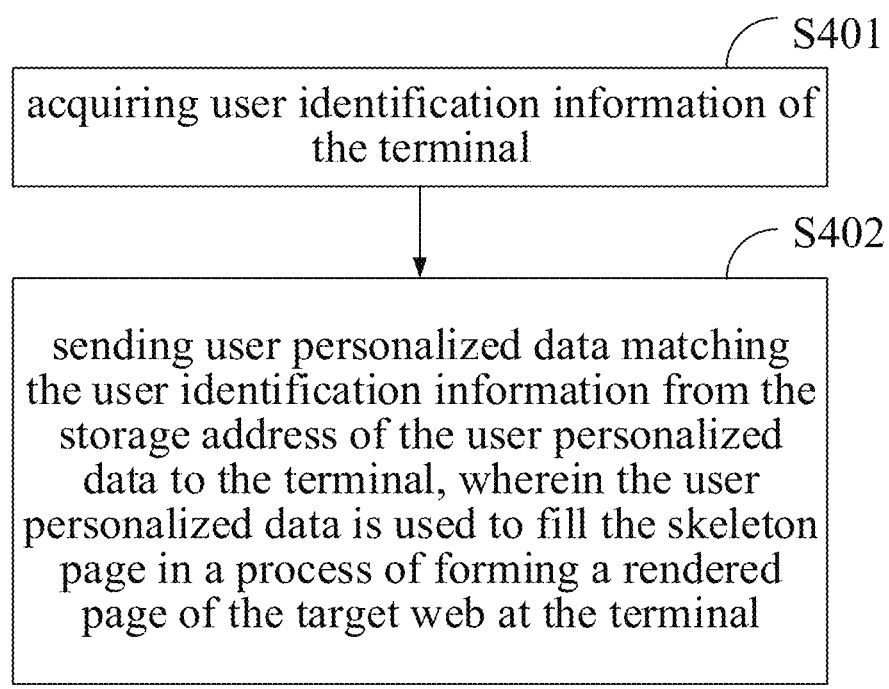
FIG. 4 is a schematic diagram showing a webpage rendering method according to a first embodiment of the present application.

As shown in FIG. 4, the method further includes the following steps.

S401, acquiring user identification information of the terminal.

S402, sending user personalized data matching the user identification information from the storage address of the user personalized data to the terminal, wherein the user personalized data is used to fill the skeleton page in a process of forming a rendered page of the target webpage at the terminal.

In the case where a script language file is acquired by a terminal, by executing the script language file, user identification information (Cookie) may be sent to a storage address of the user personalized data.

After acquiring user identification information, a server may query user personalized data matching the user identification information in a storage area, where the storage area corresponds to the storage address of the user personalized data. The queried user personalized data is sent to a terminal, so that the terminal may use the user personalized data to fill a skeleton page in a process of forming a rendered page of a target webpage.

With reference to FIG. 5, data corresponding to "Ranking", "Creator", "Number of Videos", and "Income (RMB)" in FIG. 5 are user personalized data. After the above user personalized data are acquired, a skeleton page is filled with the user personalized data, so that a final page of a target webpage may be formed.

By applying the above scheme, in a case that user personalized data is acquired, a skeleton page may be filled with the user personalized data, to form a final page of a target webpage. A terminal may obtain a target webpage as quickly as possible, thereby reducing white screen time and waiting time for rendering.

Figure 6:
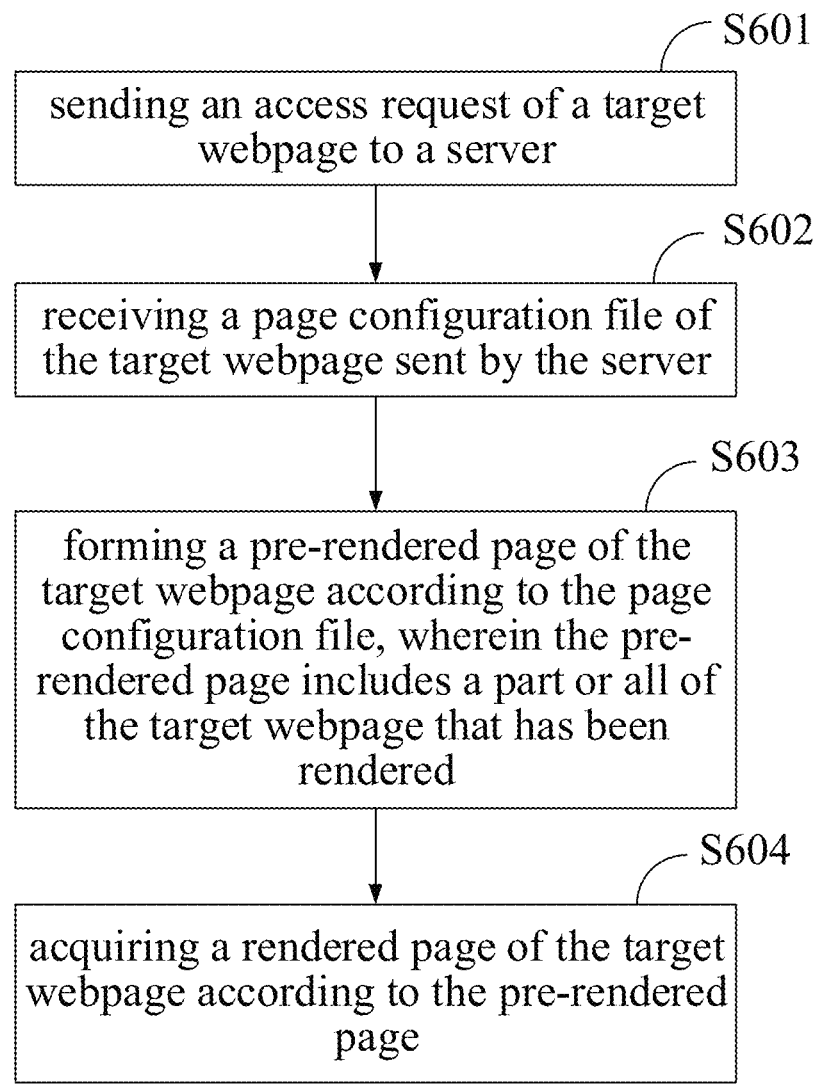
FIG. 6 is a schematic diagram showing a webpage rendering method according to a second embodiment of the present application.

As shown in FIG. 6, it is a flowchart showing a web rendering method according to embodiment of the present application, which is applied to a terminal. The method includes the following steps:

S601, sending an access request of a target webpage to a server;

S602, receiving a page configuration file of the target webpage sent by the server;

S603, forming a pre-rendered page of the target webpage according to the page configuration file, wherein the pre-rendered page includes a part or all of the target webpage that has been rendered; and S604, acquiring a rendered page of the target webpage according to the pre-rendered page.

A terminal sends an access request of a target webpage to a server through a browser or an application program. After a page configuration file of a target webpage sent by a server is received, the page configuration file is executed, so that a pre-rendered page of the target webpage may be formed.

A pre-rendered page includes a part or all of a target webpage that has been rendered. In a case where a pre-rendered page includes all of a target webpage that has been rendered, the pre-rendered page may be used as a rendered page of the target webpage. In a case where a pre-rendered page includes a part of a target webpage that has been rendered, a terminal further performs a rendering process according to the pre-rendered page, to acquire a rendered page of the target webpage.

In an implementation, the page configuration file is stored in a content distribution network;

S602 includes:

receiving the page configuration file of the target webpage sent by the server from the content distribution network.

In an implementation, the page configuration file includes a Hypertext markup language file, a cascading style sheet file, and a script language file, where the Hypertext markup language file is stored in a first content distribution network; and the cascading style sheet file and the script language file are stored in a second content distribution network, where an address of the first content distribution network is the same as an address of the target webpage, and an address of the second content distribution network is included in the Hypertext markup language file.

Figure 7:
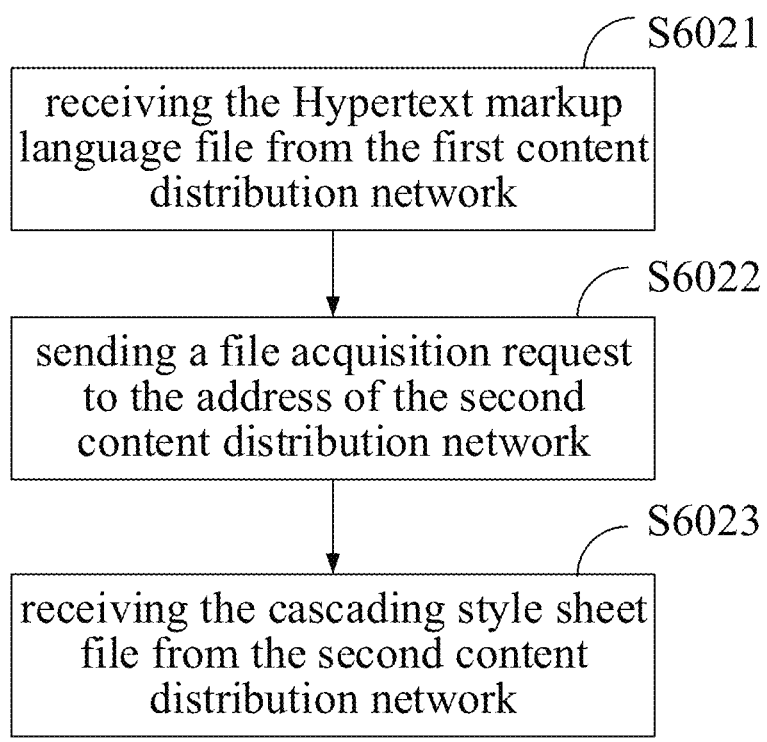
FIG. 7 is a schematic diagram showing a webpage rendering method according to a second embodiment of the present application.

As shown in FIG. 7, in an implementation, the receiving the page configuration file of the target webpage sent by the server from the content distribution network includes:

S6021, receiving the Hypertext markup language file from the first content distribution network.

S6022, sending a file acquisition request to the address of the second content distribution network.

S6023, receiving the cascading style sheet file from the second content distribution network.

A terminal firstly receives a Hypertext markup language file sent by a server from a first content distribution network. According to an address of a second content distribution network declared in the Hypertext markup language file, a file acquisition request is sent to the address.

In a case where a server receives a file acquisition request, it may send a cascading style sheet file from a second content distribution network to a terminal, so that the terminal may receive the cascading style sheet file from the second content distribution network.

In an implementation, S603 includes: forming the pre-rendered page of the target webpage according to the Hypertext markup language file and the cascading style sheet file.

A terminal may acquire a pre-rendered page of a target webpage according to a Hypertext markup language file and a cascading style sheet file. The pre-rendered page corresponds, for example, to a page in the schematic diagram shown in FIG. 2.

In an implementation, in a case that the pre-rendered page includes a part of the target webpage that has been rendered, a remaining part of the target webpage is filled with a skeleton page.

Figure 8:
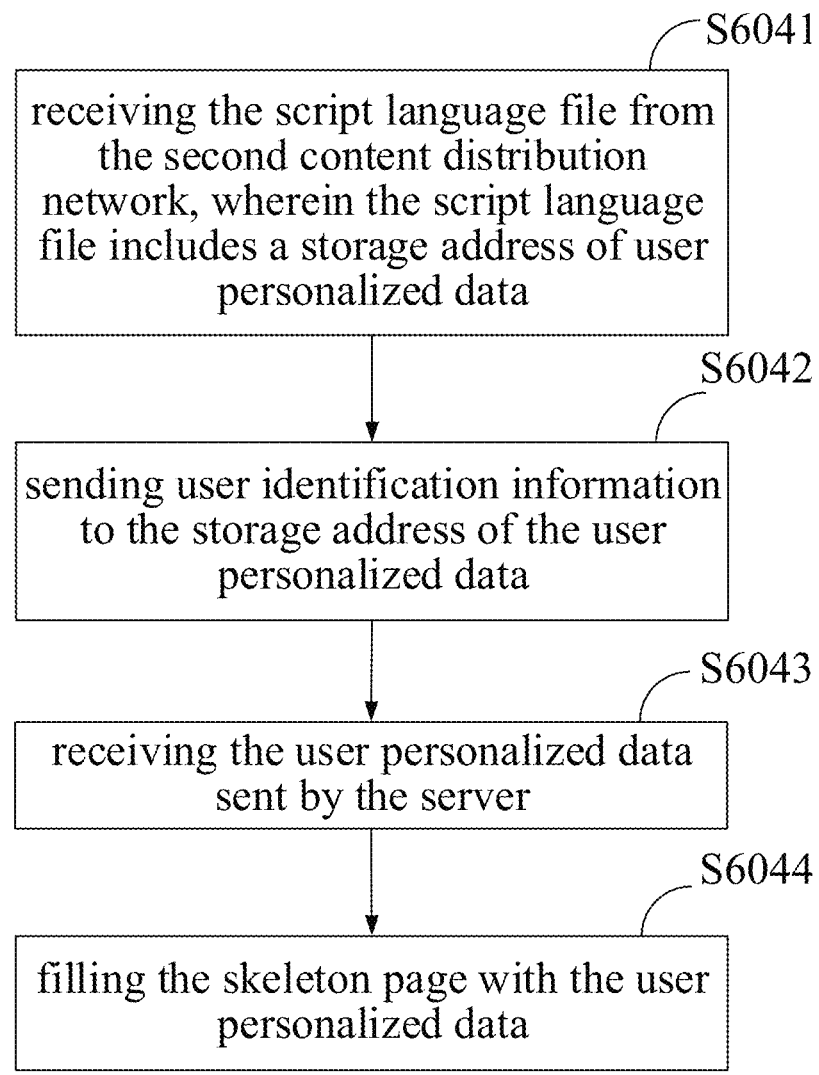
FIG. 8 is a schematic diagram showing a webpage rendering method according to a second embodiment of the present application.

As shown in FIG. 8, S604 includes:

S6041, receiving the script language file from the second content distribution network, wherein the script language file includes a storage address of user personalized data.

S6042, sending user identification information to the storage address of the user personalized data.

S6043, receiving the user personalized data sent by the server.

S6044, filling the skeleton page with the user personalized data.

In a case where a terminal acquires a script language file, by executing the script language file, user identification information may be sent to a storage address of the user personalized data.

After acquiring user identification information, a server may query user personalized data matching the user identification information in a storage area, where the storage area corresponds to the storage address of the user personalized data. User personalized data may be an avatar, an online duration, an experience value, etc. of a user. The queried user personalized data is then sent to a terminal.

After the above user personalized data are acquired by a terminal, a skeleton page is filled with the user personalized data, so that a final page of a target webpage may be formed.

Figure 9:
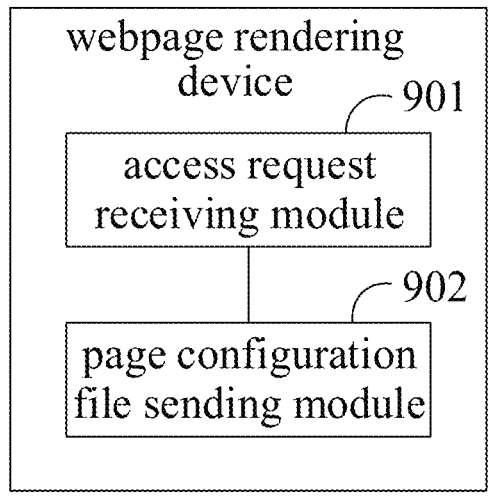
FIG. 9 is a schematic diagram showing a webpage rendering device according to a first embodiment of the present application.

As shown in FIG. 9, it is a schematic structural diagram showing a webpage rendering device of the present application, which is applied to a server. The device includes:

an access request receiving module 901, configured to receive an access request of a target webpage from a terminal;

a page configuration file sending module 902, configured to send a page configuration file of the target webpage to the terminal, in response to the access request of the target webpage, where the page configuration file is configured to form a pre-rendered page of the target webpage, and the pre-rendered page includes a part or all of the target webpage that has been rendered; and the pre-rendered page is configured to enable the terminal to acquire a rendered page of the target webpage.

In an implementation, the page configuration file is stored in a content distribution network; and the page configuration file sending module 902 sends the page configuration file of the target webpage from the content distribution network to the terminal.

In an implementation, the page configuration file includes a Hypertext markup language file, a cascading style sheet file, and a script language file.

Figure 10:
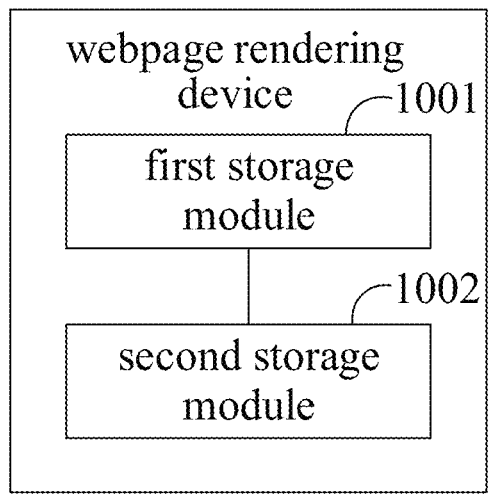
FIG. 10 is a schematic diagram showing a webpage rendering device according to a first embodiment of the present application.

As shown in FIG. 10, the webpage rendering device includes:

a first storage module 1001, configured to store the Hypertext markup language file in a first content distribution network; and a second storage module 1002, configured to store the cascading style sheet file and the script language file in a second content distribution network, wherein an address of the first content distribution network is the same as an address of the target webpage, and an address of the second content distribution network is included in the Hypertext markup language file.

Figure 11:
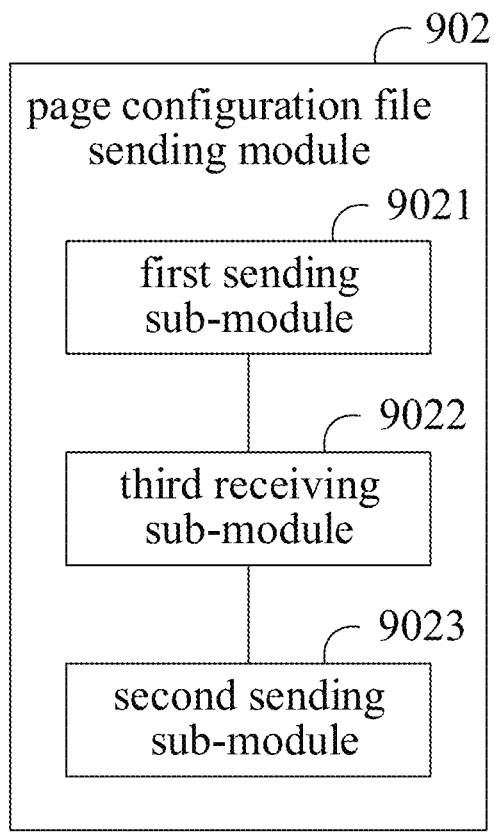
FIG. 11 is a schematic diagram showing a webpage rendering device according to a first embodiment of the present application.

As shown in FIG. 11, in an implementation, the page configuration file sending module 902 includes:

a first sending sub-module 9021, configured to send the Hypertext markup language file from the first content distribution network to the terminal according to a geographic location of the terminal;

a first receiving sub-module 9022, configured to receive a file acquisition request from the terminal; and a second sending sub-module 9023, configured to send the cascading style sheet file and the script language file from the second content distribution network to the terminal, in response to the file acquisition request.

In an implementation, in a case that the pre-rendered page is a part of the target webpage, the device further includes:

a filling module, configured to fill a skeleton page in a remaining part of the target webpage.

In an implementation, the script language file includes a storage address of user personalized data.

Figure 12:
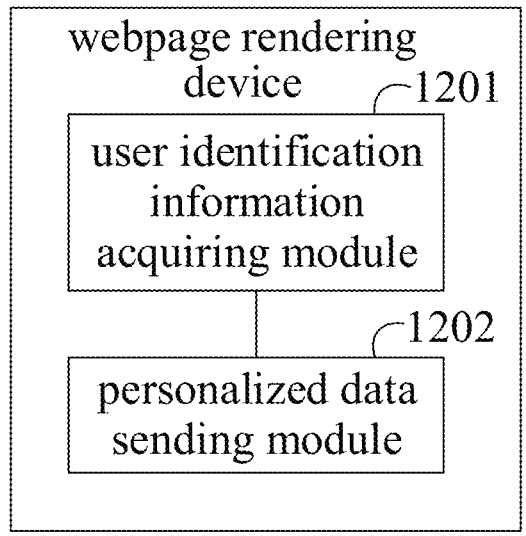
FIG. 12 is a schematic diagram showing a webpage rendering device according to a first embodiment of the present application.

As shown in FIG. 12, the webpage rendering device further includes:

a user identification information acquiring module 1201, configured to acquire user identification information of the terminal; and a personalized data sending module 1202, configured to send user personalized data matching the user identification information from the storage address of the user personalized data to the terminal, where the user personalized data is used to fill the skeleton page in a process of forming a rendered page of the target webpage at the terminal.

Figure 13:
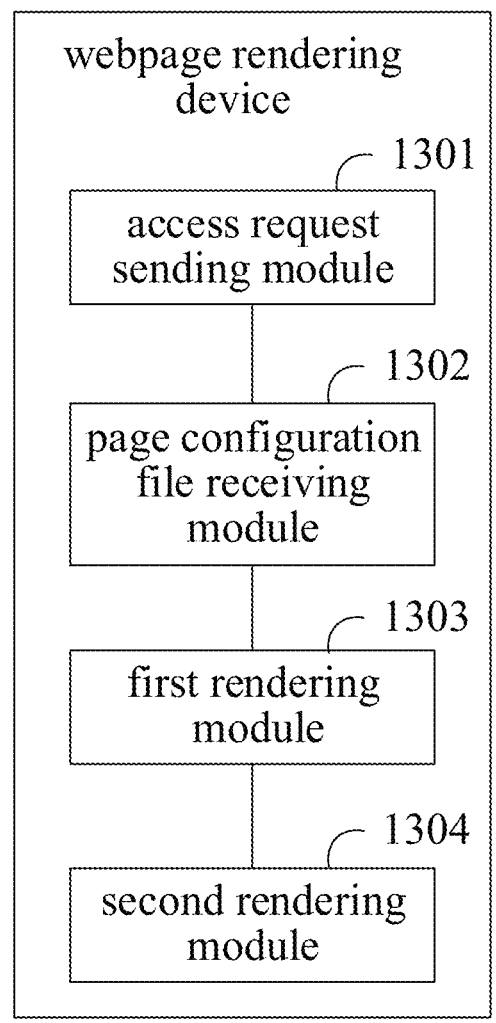
FIG. 13 is a schematic diagram showing a webpage rendering device according to a second embodiment of the present application.

As shown in FIG. 13, it is a schematic structural diagram showing a webpage rendering device according to the present application, which is applied to a terminal. The device includes:

an access request sending module 1301, configured to send an access request of a target webpage to a server;

a page configuration file receiving module 1302, configured to receive a page configuration file of the target webpage sent by the server;

a first rendering module 1303, configured to form a pre-rendered page of the target webpage according to the page configuration file, wherein the pre-rendered page includes a part or all of the target webpage that has been rendered; and a second rendering module 1304, configured to acquire a rendered page of the target webpage according to the pre-rendered page.

In an implementation, the page configuration file is stored in a content distribution network; and the page configuration file receiving module 1302 receives the page configuration file of the target webpage sent by the server from the content distribution network.

In an implementation, the page configuration file includes a Hypertext markup language file, a cascading style sheet file, and a script language file, where the Hypertext markup language file is stored in a first content distribution network; and the cascading style sheet file and the script language file are stored in a second content distribution network, wherein an address of the first content distribution network is the same as an address of the target webpage, and an address of the second content distribution network is included in the Hypertext markup language file.

Figure 14:
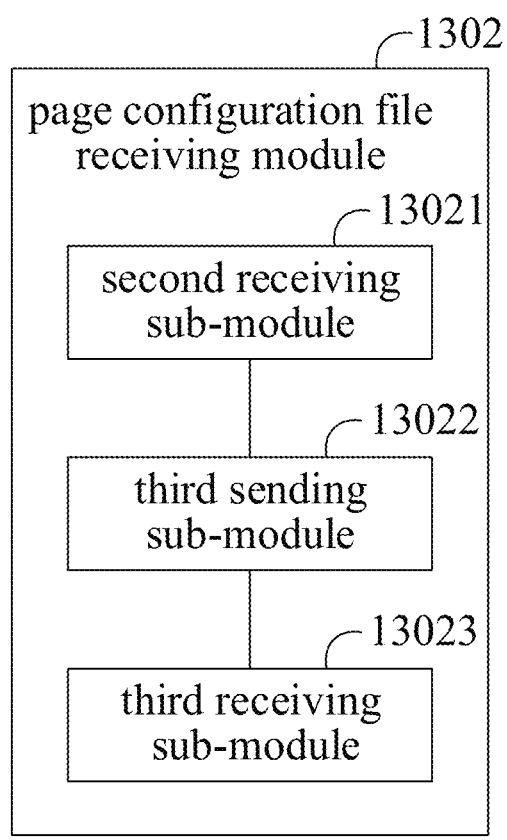
FIG. 14 is a schematic diagram showing a webpage rendering device according to a second embodiment of the present application.

As shown in FIG. 14, in an implementation, the page configuration file receiving module 1302 includes:

a second receiving sub-module 13021, configured to receive the Hypertext markup language file;

a third sending sub-module 13022, configured to send a file acquisition request to the address of the second content distribution network; and a third receiving sub-module 13023, configured to receive the cascading style sheet file from the second content distribution network.

In an implementation, the first rendering module 1303 includes:

a rendering execution sub-module, configured to form the pre-rendered page of the target webpage according to the Hypertext markup language file and the cascading style sheet file.

In an implementation, in a case that the pre-rendered page includes a part of the target webpage that has been rendered, a remaining part of the target webpage is filled with a skeleton page.

Figure 15:
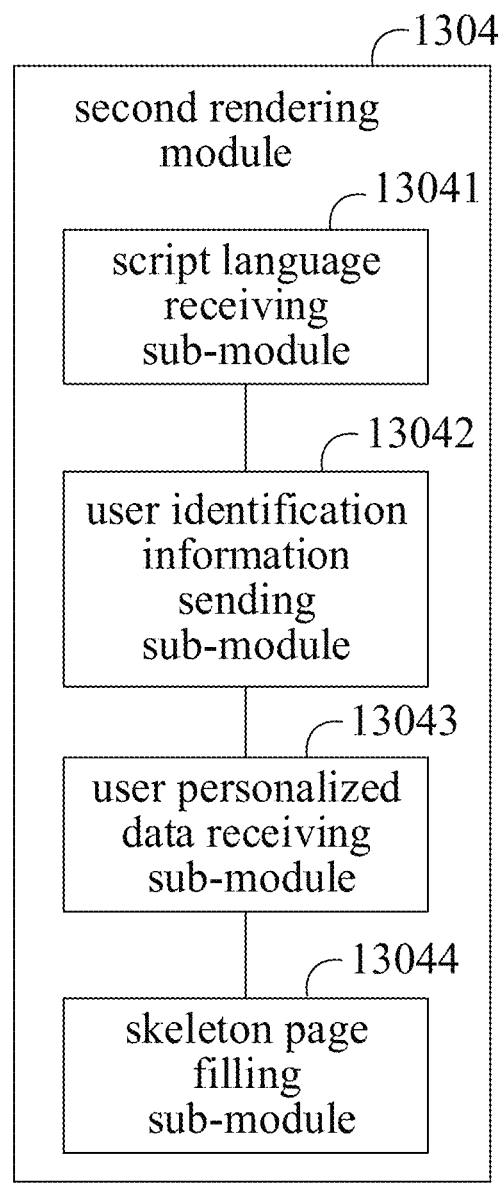
FIG. 15 is a schematic diagram showing a webpage rendering device according to a second embodiment of the present application.

As shown in FIG. 15, the second rendering module 1304 includes:

a script language file receiving sub-module 13041, configured to receive the script language file from the second content distribution network, wherein the script language file includes a storage address of user personalized data;

a user identification information sending sub-module 13042, configured to send user identification information to the storage address of the user personalized data;

a user personalized data receiving sub-module 13043, configured to receive the user personalized data sent by the server; and a skeleton page filling sub-module 13044, configured to fill the skeleton page with the user personalized data.

For functions of modules in devices according to embodiments of the present application, reference may be made to corresponding descriptions of the above method, and thus a detailed description thereof is omitted herein.

According to an embodiment of the present application, an electronic apparatus and a readable storage medium are provided in the present application.

Figure 16:
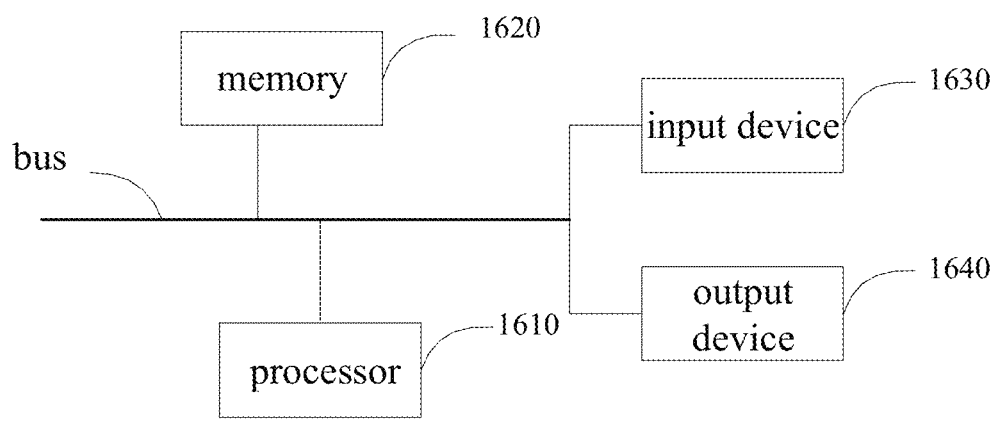
FIG. 16 is a block diagram showing an electronic apparatus for implementing a webpage rendering method according to an embodiment of the present application.

As shown in FIG. 16, it is a block diagram showing an electronic apparatus applied with a webpage rendering method according to an embodiment of the present application. The electronic apparatus is intended to represent various forms of digital computers, such as laptop computers, desktop computers, workbenches, personal digital assistants, servers, blade servers, mainframe computers, and other suitable computers. The electronic apparatus may also represent various forms of mobile devices, such as personal digital processors, cellular phones, intelligent phones, wearable devices, and other similar computing devices. Components shown in the present application, their connections and relations, and their functions are merely examples, and are not intended to limit the implementation of the application described and/or required herein.

As shown in FIG. 16, the electronic apparatus includes: one or more processors 1610, a memory 1620, and interfaces for connecting various components, including a high-speed interface and a low-speed interface. The various components are interconnected using different buses and may be mounted on a common motherboard or otherwise installed as required. The processor may process instructions executed within the electronic apparatus, including instructions for storing in or on a memory, to display graphical information of a graphical user interface (GUI) on an external input/output device (such as a display device coupled to the interface). In other implementations, multiple processors and/or multiple buses may be used with multiple memories, if desired. Similarly, multiple electronic apparatuses may be connected, each apparatus providing some of the necessary operations (for example, as a server array, a group of blade servers, or a multiprocessor system). In FIG. 16A, one processor 1610 is shown as an example.

The memory 1620 is a non-transitory computer-readable storage medium provided in the present application. The memory stores instructions executable by at least one processor, so that the at least one processor executes a webpage rendering method provided in the present application. The non-transitory computer-readable storage medium of the present application stores computer instructions, which are configured to enable a computer to execute a webpage rendering method provided in the present application.

As a non-transitory computer-readable storage medium, the memory 1620 may be used to store non-transitory software programs, non-transitory computer executable programs, and modules, such as program instructions/modules corresponding to a webpage rendering method in embodiments of the present application (for example, the access request receiving module 901 and the page configuration file sending module 902 shown in FIG. 9, and/or the access request sending module 1301, the page configuration file receiving module 1302, the first rendering module 1303, and the second rendering module 1304 shown in FIG. 13). The processor 1610 executes various functional applications and data processing of the server by running non-transitory software programs, instructions, and modules stored in the memory 1620, that is, to implement a webpage rendering method in foregoing method embodiments.

The memory 1620 may include a storage program area and a storage data area, where the storage program area may be used to store an application program required by an operating system or for at least one function; the storage data area may be used to store data created according to the use of an electronic device applied with a webpage rendering method, and the like. In addition, the memory 1620 may include a high-speed random-access memory, and may also include a non-transitory memory, such as at least one magnetic disk storage device, a flash memory device, or other non-transitory solid-state storage device. In some embodiments, the memory 1620 may optionally include a memory set remotely relative to the processor 901, and these remote memories may be connected to the electronic apparatus applied with a webpage rendering method through a network. Examples of the above network include, but are not limited to, an Internet, an intranet, a local area network, a mobile communication network, and combinations thereof.

An electronic apparatus applied with a webpage rendering method may further include an input device 1630 and an output device 1640. The processor 1610, the memory 1620, the input device 1630, and the output device 1640 may be connected through a bus or in other manners. In FIG. 16, a connection through a bus is shown as an example.

The input device 1630 may receive input numeric or character information, and generate key signal inputs related to a user setting and a function control of an electronic apparatus applied with a webpage rendering method, such as a touch screen, a keypad, a mouse, a trackpad, a touchpad, a pointing stick, one or more mouse buttons, a trackball, a joystick and other input devices. The output device 1640 may include a display device, an auxiliary lighting device (for example, an LED), a haptic feedback device (for example, a vibration motor), and the like. The display device may include, but is not limited to, a Liquid Crystal Display (LCD), a Light Emitting Diode (LED) display, and a plasma display. In some implementations, the display device may be a touch screen.

Various implementations of the systems and technologies described herein may be implemented in a digital electronic circuit system, an integrated circuit system, an application specific integrated circuit (ASIC), a computer hardware, a firmware, a software, and/or combinations thereof. These various implementations may include: implementations in one or more computer programs, where the one or more computer programs are executable and/or interpretable on a programmable system including at least one programmable processor, programmable processor, where the programmable processor may be a dedicated or general-purpose programmable processor that may receive data and instructions from a storage system, at least one input device, and at least one output device, and may transmit the data and instructions to the storage system, the at least one input device, and the at least one output device.

These computing programs (also known as programs, software, software applications, or codes) include machine instructions of a programmable processor and may be implemented by using a high-level procedural and/or object-oriented programming language, and/or an assembly/machine language. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide an interaction with a user, systems and techniques described herein may be implemented on a computer, where the computer includes: a display device (for example, a Cathode Ray Tube (CRT) or liquid crystal display (LCD) monitor) for displaying information to a user; and a keyboard and pointing device (such as a mouse or a trackball) through which a user may provide input to a computer. Other kinds of devices may also be used to provide interaction with a user. For example, a feedback provided to a user may be a sensory feedback in any form (for example, a visual feedback, an auditory feedback, or a haptic feedback), and a user input (including an acoustic input, a voice input, or a tactile input) may be received in any form.

The systems and technologies described herein may be implemented in a computing system including a background component (for example, as a data server), a computing system including a middleware component (for example, an application server), or a computing system including a front-end component (for example, a user computer with a graphical user interface or a web browser, through which the user may interact with an implementation of the systems and technologies described herein), or a computer system including any combination of such a background component, a middleware component, or a front-end component. The components of the system may be interconnected by any form or medium of digital data communication (such as, a communication network). Examples of a communication network include a Local Area Network (LAN), a Wide Area Network (WAN), and the Internet.

A computer system may include a client and a server. The client and the server are generally remote from each other and typically interact with each other through a communication network. A client-server relation is generated by executing computer programs running on respective computers and having a client-server relation with each other.

Figure 17:
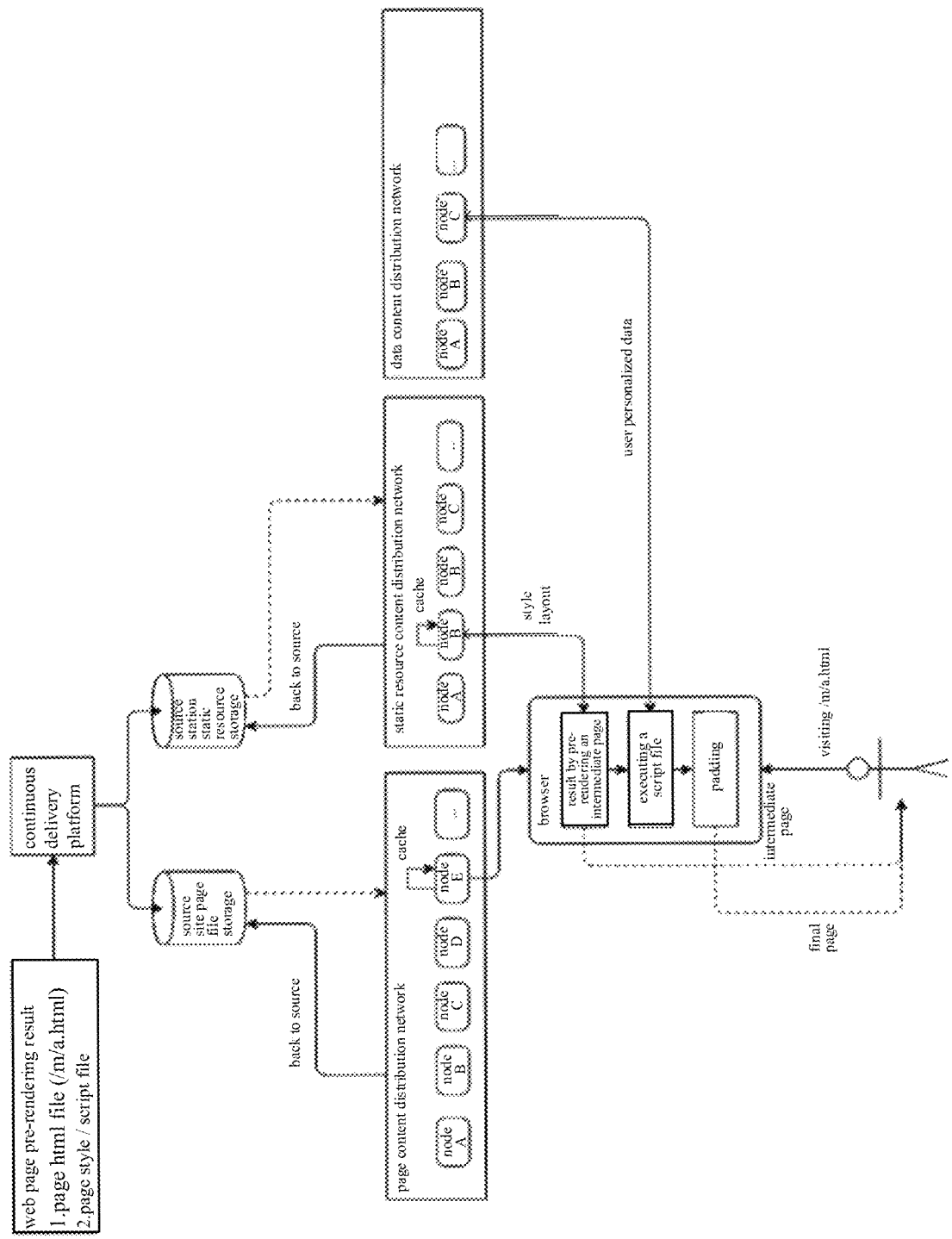
FIG. 17 is a scene diagram for implementing a webpage rendering method according to an embodiment of the present application.

As shown in FIG. 17, it is a scene diagram for implementing a webpage rendering method.

A server runs a pre-written configuration file in a Hypertext markup language format and split the configuration file into a page html file, a page style file, and a scripting file. The above files may correspond to a Hypertext Markup Language (Html) file, a Cascading Style Sheet (CSS) file, and a Scripting Language (JS) file in foregoing embodiments, respectively.

The server stores the above files to a continuous delivery platform. The page html file is stored in a storage area corresponding to a page file storage of a source station. The page style file and the script file are stored in a storage area corresponding to a static resource storage of a source station.

Further, the page html file is stored in a page content distribution network from the storage area corresponding to the page file storage of the source station. The page content distribution network may correspond to a first content distribution network in foregoing embodiments. An address of the first content distribution network may be "/m/a.html".

The page style file and the script file are stored in a static resource content distribution network from the storage area corresponding to static resource storage of the source station. The static resource content distribution network may correspond to a second content distribution network in foregoing embodiments.

When a target webpage is to be accessed by using a browser at a terminal, "/m/a.html" may be input. According to a geographic location of the terminal, the server selects a node E and sends the page html file from the first content distribution network to the terminal.

In the above process, if the server detects that the page html file is not stored in the node E, it needs to return to the storage area corresponding to the page file storage of the source station, and sent the page html file to the node E. The page html file is cached in the node E, so that in a subsequent process, in a case where the target webpage is assessed again at the (another) terminal, the page html file may be sent by the server from the node E.

After acquiring the page html file, according to the address of the static resource content distribution network declared in the page html file, the terminal sends a file acquisition request to address.

After receiving the file acquisition request, the server sends the page style file and the script file from the static resource content distribution network to the terminal.

Similarly, the server may select a corresponding node in the static resource content distribution network according to the geographic location of the terminal, and then send the page style file and the script file from the selected node to the terminal.

After the terminal acquires the page html file and the page style file, a pre-rendered intermediate state page result may be formed. In a case where the pre-rendered intermediate state page result is a part of a target webpage that has been rendered, the remaining part of the target webpage is filled with a skeleton page, where the skeleton page is used to occupy a position. The pre-rendered intermediate state page result corresponds to an intermediate state page, which may be a combined page of a part of the target webpage that has been rendered and a skeleton page. This combined page corresponds, for example, to the schematic diagram of the page shown in FIG. 2.

After acquiring the script file, the terminal executes the script file. User identification information is sent to the address of the data content distribution network declared in the script file. The address of the data content distribution network corresponds to a storage address of user personalized data in foregoing embodiments. The server sends user personalized data matching the user identification information from the address of the data content distribution network to the terminal.

The terminal receives the user personalized data from the server and fills the skeleton page with the user personalized data, that is, the terminal performs a filling operation to occupy a position, thereby forming a final state page. The final state page corresponds to the schematic diagram of the page shown in FIG. 5.

According to the technical solution of embodiments of the present application, the problems of large workload of a server and slow speed of accessing a page by a terminal are solved, where the problem is caused by the following reason: a server needs to perform a rendering operation when receiving an access request of a target webpage each time. The workload of a server is greatly reduced. After receiving an access request, a server does not perform any rendering operation, which is performed by a terminal instead. Since a page configuration file may be used to form a pre-rendered page of a target webpage, a terminal may directly generate a pre-rendered page and a rendered page after acquiring the configuration file, thereby improving efficiency in overall.

It should be understood the steps in the various processes described above may be reordered or omitted, or other steps may be added therein. For example, the steps described in the application may be performed parallelly, sequentially, or in different orders, as long as the desired results of the technical solutions disclosed in the application may be achieved, to which no limitation is made herein.

The embodiments above do not constitute a limitation on the protection scope of the present application. It should be understood by those skilled in the art that various modifications, combinations, sub-combinations, and substitutions may be available according to design requirements and other factors. Any modifications, equivalent replacements and improvements made within the spirit and principle of the present application shall be covered within the protection scope of the present application.

What is claimed is:

1. A webpage rendering method, applied to a server, wherein the webpage rendering method comprises:
receiving an access request of a target webpage from a terminal; and
sending a Hypertext markup language file of the target webpage from a first content distribution network as a static resource server to the terminal, in response to the access request of the target webpage, wherein
the Hypertext markup language file is configured to display an intermediate state page of the target webpage, and the intermediate state page comprises a part or all of the target webpage that has been rendered; and
the intermediate state page is configured to enable the terminal to acquire a rendered page of the target webpage,
wherein an address of the first content distribution network as the static resource server is the same as an address of the target webpage, and
the method further comprises:
sending a cascading style sheet file and a script language file from a second content distribution network to the terminal.

2. The webpage rendering method according to claim 1, wherein the Hypertext markup language file is stored in a storage area corresponding to a page file storage of a source station, and the page style file and the script file are stored in a storage area corresponding to a static resource storage of a source station.

3. The webpage rendering method according to claim 2, wherein
an address of the second content distribution network is comprised in the Hypertext markup language file.

4. The webpage rendering method according to claim 3, wherein the sending the Hypertext markup language file of the target webpage from the first content distribution network as the static resource server to the terminal, comprises:
sending the Hypertext markup language file from the first content distribution network to the terminal according to a geographic location of the terminal.

5. The webpage rendering method according to claim 3, wherein in a case that the intermediate state page is a part of the target webpage, the webpage rendering method further comprises:
filling a remaining part of the target webpage with a skeleton page.

6. The webpage rendering method according to claim 5, wherein the script language file comprises a storage address of user personalized data, and
the webpage rendering method further comprises:
acquiring user identification information of the terminal; and
sending user personalized data matching the user identification information from the storage address of the user personalized data to the terminal, wherein
the user personalized data is used to fill the skeleton page in a process of forming a rendered page of the target webpage at the terminal.

7. A webpage rendering method, applied to a terminal, wherein the webpage rendering method comprises:
sending an access request of a target webpage to a server;
receiving a Hypertext markup language file of the target webpage sent from a first content distribution network as a static resource server;
displaying an intermediate state page of the target webpage according to the Hypertext markup language file, wherein the intermediate state page comprises a part or all of the target webpage that has been rendered; and
acquiring a rendered page of the target webpage according to the intermediate state page,
wherein an address of the first content distribution network as the static resource server is the same as an address of the target webpage, and
the method further comprises:
sending a cascading style sheet file and a script language file from a second content distribution network to the terminal.

8. The webpage rendering method according to claim 7, wherein the Hypertext markup language file is stored in a storage area corresponding to a page file storage of a source station, and the page style file and the script file are stored in a storage area corresponding to a static resource storage of a source station.

9. The webpage rendering method according to claim 8, wherein
an address of the second content distribution network is comprised in the Hypertext markup language file.

10. The webpage rendering method according to claim 9, wherein the sending the Hypertext markup language file of the target webpage from the first content distribution network as the static resource server to the terminal, comprises:
sending the Hypertext markup language file from the first content distribution network to the terminal according to a geographic location of the terminal.

11. The webpage rendering method according to claim 10, wherein the method further comprises:
displaying the intermediate state page of the target webpage according to the Hypertext markup language file and the cascading style sheet file.

12. The webpage rendering method according to claim 11, wherein in a case that the intermediate state page comprises a part of the target webpage that has been rendered, a remaining part of the target webpage is filled with a skeleton page; and
the acquiring the rendered page of the target webpage according to the intermediate state page comprises:
receiving the script language file from the second content distribution network, wherein the script language file comprises a storage address of user personalized data;

sending user identification information to the storage address of the user personalized data;
receiving the user personalized data sent by the server; and
filling the skeleton page with the user personalized data.

13. A webpage rendering device, applied to a server, wherein the webpage rendering device comprises:
    at least one processor; and
    a memory communicated with the at least one processor, wherein
    instructions executable by the at least one processor are stored in the memory, the instructions are executed by the at least one processor, to enable the at least one processor to:
    receive an access request of a target webpage from a terminal; and
    send a Hypertext markup language file of the target webpage from a first content distribution network as a static resource server to the terminal, in response to the access request of the target webpage, wherein
    the Hypertext markup language file is configured to display an intermediate state page of the target webpage, and the intermediate state page comprises a part or all of the target webpage that has been rendered; and
    the intermediate state page is configured to enable the terminal to acquire a rendered page of the target webpage,
    wherein an address of the first content distribution network as the static resource server is the same as an address of the target webpage, and
    the instructions are executed by the at least one processor, to enable the at least one processor further to:
    send a cascading style sheet file and a script language file from a second content distribution network to the terminal.

14. The webpage rendering device according to claim 13, wherein
    an address of the second content distribution network is comprised in the Hypertext markup language file.

15. The webpage rendering device according to claim 14, wherein the instructions are executed by the at least one processor, to enable the at least one processor to:
    send the Hypertext markup language file from the first content distribution network to the terminal according to a geographic location of the terminal.

16. The webpage rendering device according to claim 14, wherein in a case that the intermediate state page is a part of the target webpage, the instructions are executed by the at least one processor, to enable the at least one processor to:
    filling a remaining part of the target webpage with a skeleton page.

17. The webpage rendering device according to claim 16, wherein the script language file comprises a storage address of user personalized data, and
    the instructions are executed by the at least one processor, to enable the at least one processor to:
    acquire user identification information of the terminal; and
    send user personalized data matching the user identification information from the storage address of the user personalized data to the terminal, wherein
    the user personalized data is used to fill the skeleton page in a process of forming a rendered page of the target webpage at the terminal.

18. A webpage rendering device, applied to a terminal, wherein the webpage rendering device comprises:
    at least one processor; and
    a memory communicated with the at least one processor, wherein
    instructions executable by the at least one processor are stored in the memory, the instructions are executed by the at least one processor, to enable the at least one processor to:
    send an access request of a target webpage to a server;
    receive a Hypertext markup language file of the target webpage sent from a first content distribution network as a static resource server;
    display an intermediate state page of the target webpage according to the Hypertext markup language file, wherein the intermediate state page comprises a part or all of the target webpage that has been rendered; and
    acquire a rendered page of the target webpage according to the intermediate state page,
    wherein an address of the first content distribution network as the static resource server is the same as an address of the target webpage, and
    send a cascading style sheet file and a script language file from a second content distribution network to the terminal.

19. A non-transitory computer-readable storage medium, in which computer instructions are stored, wherein the computer instructions are configured to enable a computer to:
    receive an access request of a target webpage from a terminal; and
    send a Hypertext markup language file of the target webpage from a first content distribution network as a static resource server to the terminal, in response to the access request of the target webpage, wherein
    the Hypertext markup language file is configured to display an intermediate state page of the target webpage, and the intermediate state page comprises a part or all of the target webpage that has been rendered; and
    the intermediate state page is configured to enable the terminal to acquire a rendered page of the target webpage,
    wherein an address of the first content distribution network as the static resource server is the same as an address of the target webpage, and
    send a cascading style sheet file and a script language file from a second content distribution network to the terminal.

20. A non-transitory computer-readable storage medium, in which computer instructions are stored, wherein the computer instructions are configured to enable a computer to:
    send an access request of a target webpage to a server;
    receive a Hypertext markup language file of the target webpage sent from a first content distribution network as a static resource server;
    display an intermediate state page of the target webpage according to the Hypertext markup language file, wherein the intermediate state page comprises a part or all of the target webpage that has been rendered; and
    acquire a rendered page of the target webpage according to the intermediate state page, wherein an address of the first content distribution network as the static resource server is the same as an address of the target webpage, and send a cascading style sheet file and a script language file from a second content distribution network to the terminal.

* * * * *